United States Patent
Steiner

(10) Patent No.: US 7,216,595 B2
(45) Date of Patent: May 15, 2007

(54) SEED PLANTING DEVICE, AND DIBBER THEREFOR

(75) Inventor: Paul Steiner, Bikat Beit Hakerem (IL)

(73) Assignee: Kapro Industries, Ltd, Beit Hakerem (IL)

( * ) Notice: Subject to any disclaimer, the term of this patent is extended or adjusted under 35 U.S.C. 154(b) by 69 days.

(21) Appl. No.: 10/547,738

(22) PCT Filed: Feb. 29, 2004

(86) PCT No.: PCT/IL2004/000196

§ 371 (c)(1),
(2), (4) Date: Sep. 2, 2005

(87) PCT Pub. No.: WO2004/077929

PCT Pub. Date: Sep. 16, 2004

(65) Prior Publication Data

US 2006/0272560 A1    Dec. 7, 2006

(30) Foreign Application Priority Data

Mar. 6, 2003    (IL)    ..................................... 154799

(51) Int. Cl.
*A01C 5/00*    (2006.01)

(52) U.S. Cl. ....................................................... 111/99

(58) Field of Classification Search ........ 111/115–117, 111/89–99
See application file for complete search history.

(56) References Cited

U.S. PATENT DOCUMENTS

| 2,044,871 A | 6/1936 | Lawton |
| 5,325,798 A | 7/1994 | Nowell et al. |
| 6,024,034 A | 2/2000 | Howell |

FOREIGN PATENT DOCUMENTS

| GB | 20696 A | 6/1910 |
| GB | 2 294 623 A | 3/1996 |

*Primary Examiner*—Christopher J. Novosad
(74) *Attorney, Agent, or Firm*—The Nath Law Group; Harold L. Novick

(57) ABSTRACT

A handheld seed planting device including a rule-like seed spacing member with two or more dibbers and a depth marker for facilitating seed planting in terms of the spacing between neighboring seeds and/or their seed planting depth. Dibbers preferably double up as depth markers but a depth marker may alternatively be implemented as a simple depth gauge for clipping onto a seed spacing member.

4 Claims, 4 Drawing Sheets

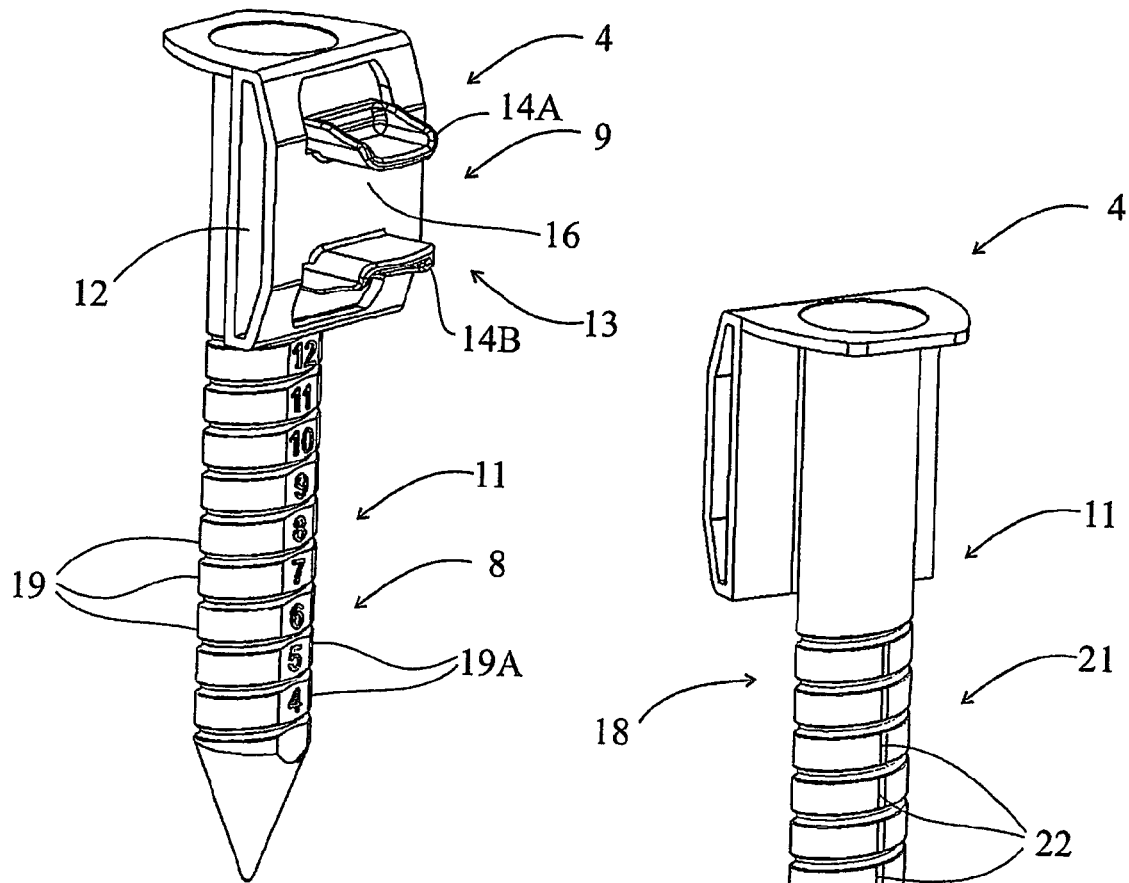
FIG. 2
FIG. 3
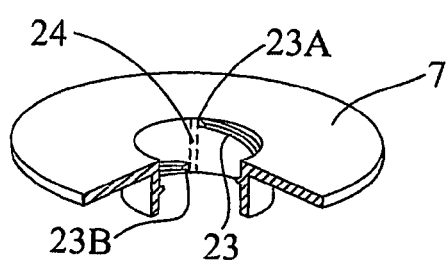
FIG. 4

SEED PLANTING DEVICE, AND DIBBER THEREFOR

CROSS-REFERENCE TO RELATED APPLTCATIONS

This application is the United States National Stage filing of PCT Application PCT/IL2004/000196 having an international filing date of Feb. 29, 2004.

FIELD OF THE INVENTION

The invention is in the field of handheld seed planting devices.

BACKGROUND OF THE INVENTION

Successful seed growth depends inter alia on the spacing between neighboring seeds and their planting depth. Seed planting devices to address seed spacing and/or seed planting depth are disclosed in inter alia U.S. Pat. No. 1,983,815 to Schmiett, U.S. Pat. No. 2,865,315 to Goldstein, U.S. Pat. No. 3,977,573 to Coleman, U.S. Pat. No. 4,275,672 to Clad, U.S. Pat. No. 4,315,580 to Beckworth, U.S. Pat. No. 5,099,772 to Murray, U.S. Pat. No. 6,634,305 to Braun, US Patent Application Publication US 2002/0092450 to Sawers et al., UK Patent Application GB 2 294 623 to Chorley, U.S. Design Pat. No. 161,913 to Fraim, U.S. Design Pat. No. 280,882 to Rea, and U.S. Design Pat. No. 475,588 to Daniels.

SUMMARY OF THE INVENTION

The present invention is for a handheld seed planting device preferably including a rule-like seed spacing member with two or more dibbers and a depth marker for facilitating seed planting in terms of the spacing between neighboring seeds and/or their seed planting depth. Dibbers preferably double up as depth markers but a depth marker may alternatively be implemented as a depth gauge for, say, clipping onto a seed spacing member. The extreme left and right dibbers are preferably employed as depth markers for stabilizing the seed planting device for facilitating the forming of an array of seed planting holes of uniform seed planting depth. The dibbers are preferably slidingly displaceable along a seed spacing member to desired positions therealong whilst the depth markers are preferably threadingly displaceable up and down a dibber to a user desired seed planting depth. The depth markers preferably click fit into arrest positions along a dibber each corresponding to a predetermined seed planting depth.

BRIEF DESCRIPTION OF THE DRAWINGS

In order to understand the invention and to see how it can be carried out in practice, preferred embodiments will now be described, by way of non-limiting examples only, with reference to the accompanying drawings in which similar parts are likewise numbered, and in which:

FIGS. 2 and 3 are front and rear perspective views of a dibber of FIG. 1's seed planting device, respectively;

FIG. 4 is a partially cut away perspective view of a depth marker of FIG. 1's seed planting device;

DETAILED DESCRIPTION OF PREFERRED EMBODIMENT

Figure 1:
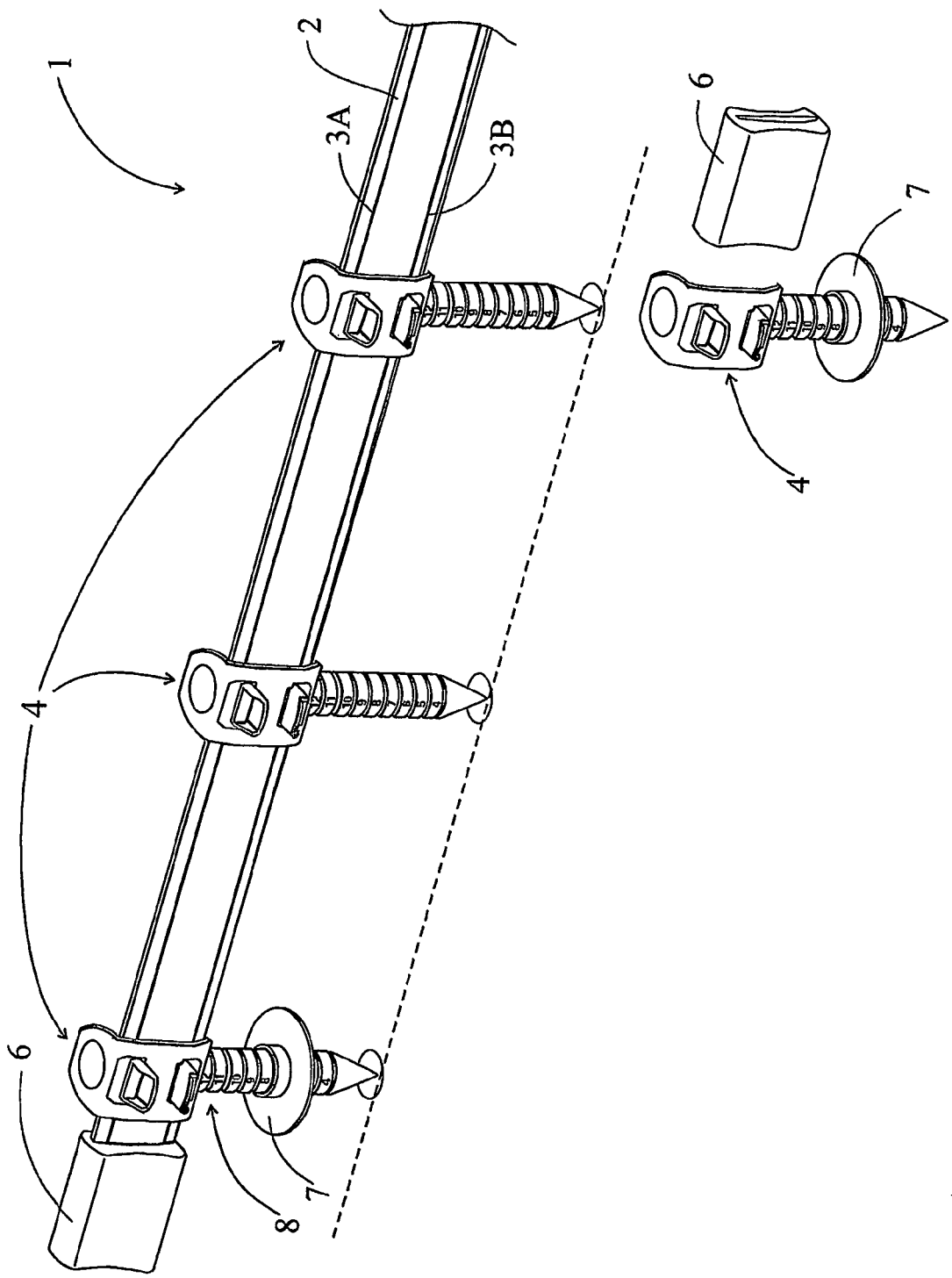
FIG. 1 is a perspective view of a partially dissembled seed planting device in accordance with one embodiment of the present invention.

FIG. 1 shows a seed planting device 1 including an extruded aluminum rule-like seed spacing member 2 with a pair of spaced apart parallel retaining tracks 3A and 3B. The seed spacing member 2 has seed spacing indicia therealong in the form of imperial and/or metric graduations, or alternatively, markings representing different seeds or types of seeds sharing the same optimal seed spacing. The seed spacing member 2 has two or more dibbers 4 slidingly displaceably therealong and a pair of removable end members 6 for enabling the addition or removal of dibbers depending on the desired spacing between adjacent dibbers, replacement purposes, and the like. The extreme left and right dibbers 4 have collared depth markers 7 for stabilizing the seed planting device 1 for forming an array of preferably equidistanced planting holes of preferably uniform seed planting depth between minimum and maximum seed planting depths of 4 cm and 12 cm, respectively. The dibbers 4 include graduated scales 8 for displaying seed planting depths as measured their tips.

Figure 5A:
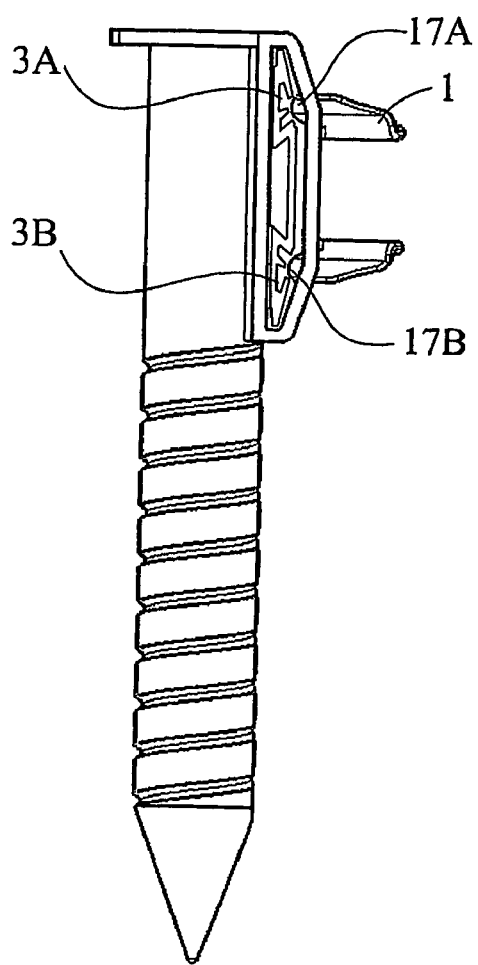
FIGS. 5A and 5B are side views showing a dibber respectively clamping and releasing the seed spacing member of FIG. 1's seed planting device.
Figure 5B:
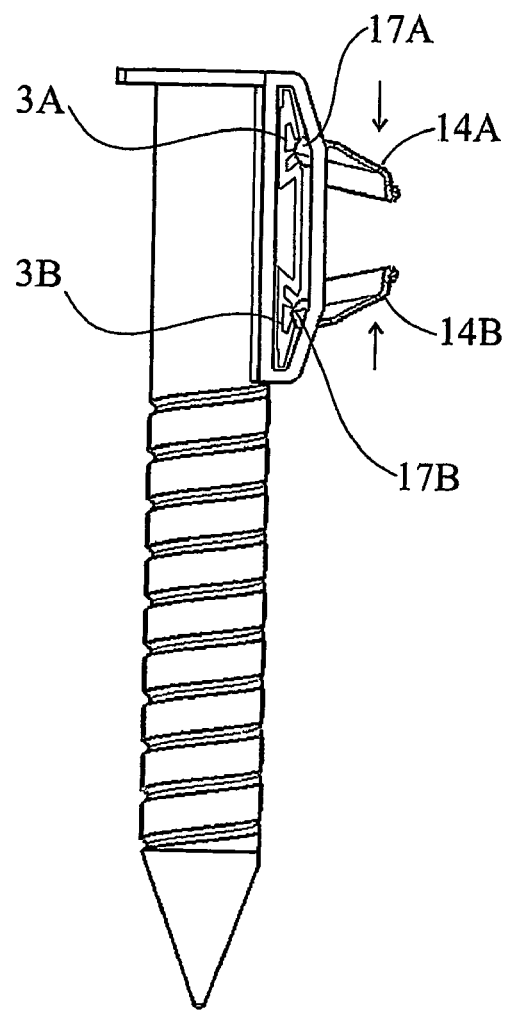

FIG. 2 shows that a dibber 4 has an attachment head 9 and a soil insertion member 11. The attachment head 9 is formed with a throughgoing aperture 12 shaped and dimensioned for slidingly receiving the seed spacing member 2 therethrough, and a manually operated clamp 13 for releasably clamping the seed spacing member 2. The clamp 13 includes a pair of finger tabs 14A and 14B for resiliently outwardly flexing a web portion 16 having a pair of internally disposed gripping projections 17A and 17B from a normal clamping position for clamping the retaining tracks 3A and 3B (see FIG. 5A) to a releasing position (see FIG. 5B) whereupon a dibber 4 can be slid to a new position along the seed spacing member 2. The soil insertion member 11 has an external 8 cm long screw thread 18 including eight complete threads 19 and an axially directed arresting ridge 21 having eight ridge segments 22 (see FIG. 3). Each thread 19 is formed with a flat display face 19A for displaying a seed planting depth as measured from the underside of a depth marker 7 to its tip.

Figure 6:
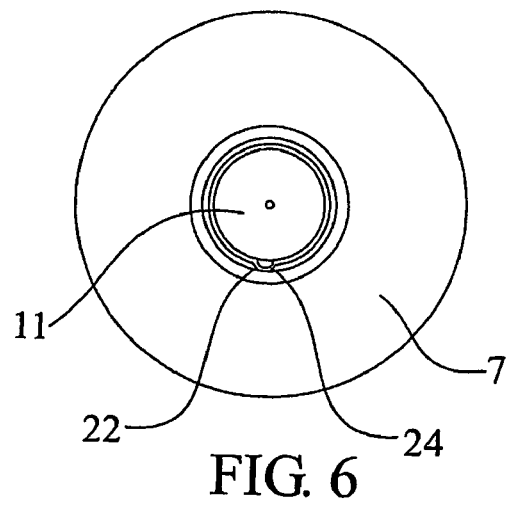
FIG. 6 is a top view showing a depth marker at an arrest position along a soil insertion member.

FIG. 4 shows that a depth marker 7 has a single slightly less than a full 360° internal screw thread 23 with opposite ends 23A and 23B defining a slightly exaggerated narrow unthreaded axially directed channel 24 therebetween shown in dashed lines. The depth marker 7 is threadingly displaceable up and down a soil insertion member 11 whilst its channel 24 is intended to click fit onto a ridge segment 22 on rotational alignment therebetween (see FIG. 6). The click fit arrangement ensures that an increased rotational force compared to the nominal rotational force required for threadingly displacing a depth marker 7 either up or down a soil insertion member 11 between adjacent arrest positions is required to initiate travel of a depth marker 7 from an arrest position.

The seed planting device of the present invention is used as follows: A user determines the optimal seed spacing for a particular type of seed he wishes to plant and sets the spacing between the dibbers along the seed spacing member accordingly possibly adding or removing dibbers. The user determines the optimal seed planting depth for the type of seed and sets both depth markers accordingly. He grasps the seed planting device and inserts the dibbers into soil for preparing an array of planting holes in accordance with their settings. He removes the seed planting device, drops seeds in the prepared seed planting holes and covers the freshly planted seeds with soil. He repeats same for more seeds of the same type or adjusts the seed planting device for planting seeds of a different type.

Figure 7:
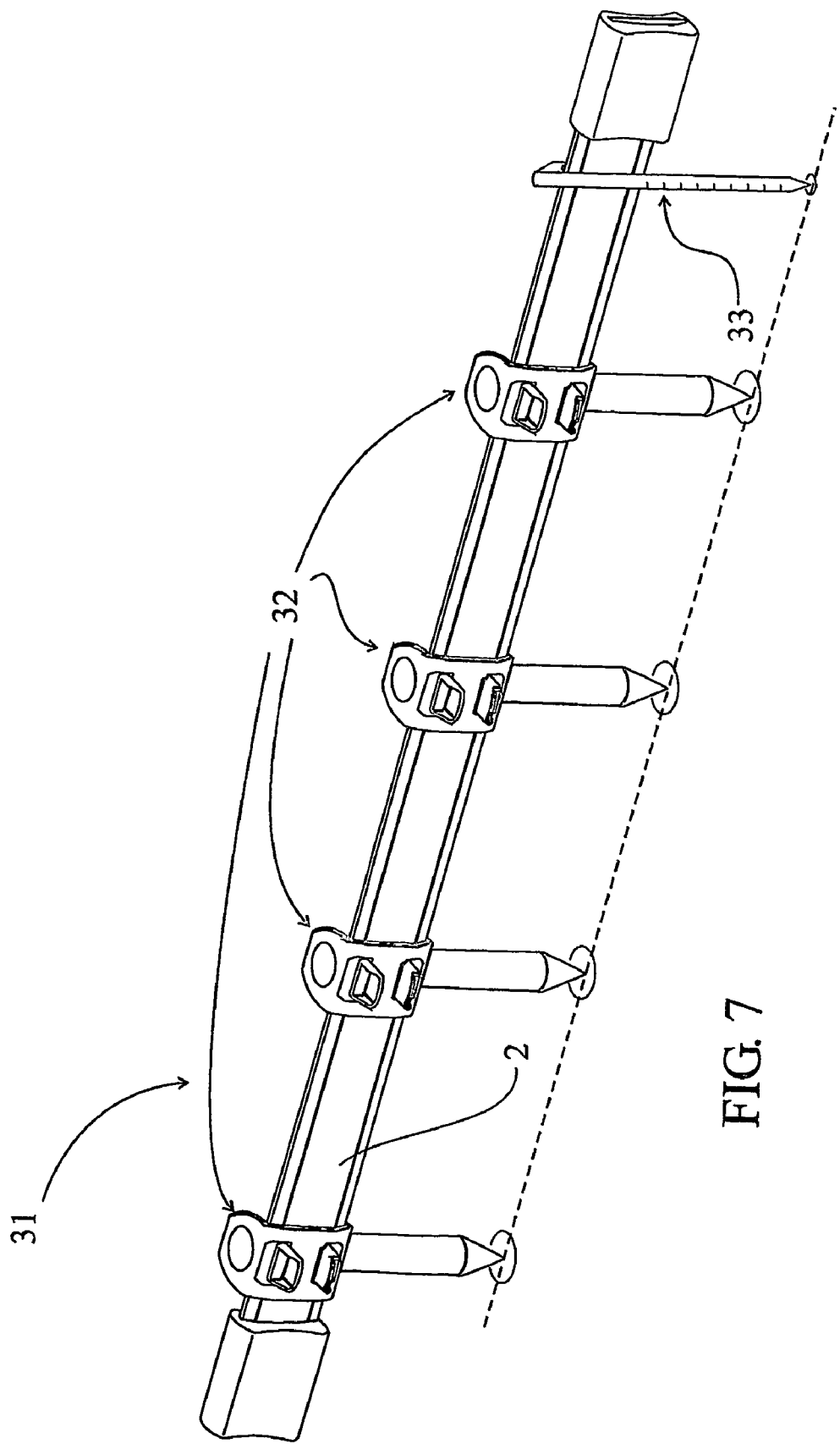
FIG. 7 is a perspective view of a seed planting device in accordance with another embodiment of the present invention.

While the invention has been described with respect to a limited number of embodiments, it will be appreciated that many variations, modifications, and other applications of the invention can be made within the scope of the appended claims. For example, FIG. 7 shows a seed planting device 31 including the seed spacing member 2 with two or more dibbers 32 slidingly displaceably therealong and a clip on depth gauge 33 for assisting in the preparation of an array of seed planting holes of a user desired seed planting depth. A dibber can slide along parallel retaining tracks formed along a seed spacing member in a similar manner to that illustrated and described in U.S. Pat. No. 6,463,666 to Szumer. A seed planting device of the present invention may be implemented with tapering dibbers and variably apertured depth markers as illustrated and described in U.S. Pat. No. 4,275, 672 to Clad.

The invention claimed is:

1. A handheld seed planting device for preparing a straight array of seed planting holes, the device comprising a single rule seed spacing member, at least two dibbers positioned along said seed spacing member and having soil insertion members downwardly depending therefrom for preparing the straight array of seed planting holes at a user desired spacing therebetween, each of said at least two dibbers having an attachment head formed with an aperture shaped and dimensioned for slidingly receiving said seed spacing member therethrough and a manually operated clamp for releasably clamping said seed spacing member, and at least one depth marker positioned along said seed spacing member and downwardly depending therefrom for assisting in the preparation of the straight array of seed planting holes at a user desired seed planting depth.

2. The device according to claim 1 wherein a soil insertion member of said at least one soil insertion member has an external screw thread and a depth marker of said at least one depth marker has an internal screw thread for screw threading displacement up and down a soil insertion member.

3. The device according to claim 1 wherein said soil insertion member includes a plurality of display faces for displaying a seed planting depth at each arrest position of said depth marker therealong.

4. A dibber for use in the seed planting device according to claim 1.

* * * * *